United States Patent [19]
Valyi

[11] Patent Number: 5,301,827
[45] Date of Patent: Apr. 12, 1994

[54] PLASTIC CONTAINER CLOSURE
[75] Inventor: Emery I. Valyi, Katonah, N.Y.
[73] Assignee: Pepsico, Inc., Purchase, N.Y.
[21] Appl. No.: 94,845
[22] Filed: Jul. 20, 1993

Related U.S. Application Data
[63] Continuation of Ser. No. 905,297, Jun. 29, 1992.
[51] Int. Cl.⁵ ............................................. B65D 17/34
[52] U.S. Cl. ................................. 220/257; 220/258; 220/259; 220/269
[58] Field of Search ............... 220/256, 257, 258, 259, 220/268, 269, 266

[56] References Cited
U.S. PATENT DOCUMENTS

| | | | |
|---|---|---|---|
| 2,146,226 | 2/1939 | Puntz | 220/269 |
| 3,216,609 | 11/1965 | Bogert | 220/269 |
| 3,245,576 | 4/1966 | Grigsz, Jr. | 220/269 |
| 4,562,936 | 1/1986 | DeFlander | 220/268 |
| 4,781,954 | 11/1988 | Krishnakumar et al. | 220/268 |
| 4,818,577 | 4/1989 | Ou-Yang | 215/348 |
| 4,830,215 | 5/1989 | Rebischung | 220/359 |
| 5,058,759 | 10/1991 | Salmang | 220/266 |
| 5,103,973 | 4/1992 | Sato | 220/268 |
| 5,125,528 | 6/1992 | Heyn et al. | 220/359 |

Primary Examiner—Joseph Man-Fu Moy
Attorney, Agent, or Firm—Bachman & LaPointe

[57] ABSTRACT

Plastic closure having a lid with a rim suitable for engagement with a plastic container to close said container and a liner adhered at the underside of the lid. Means are provided in the lid and in the liner for providing a closable opening in both.

10 Claims, 3 Drawing Sheets

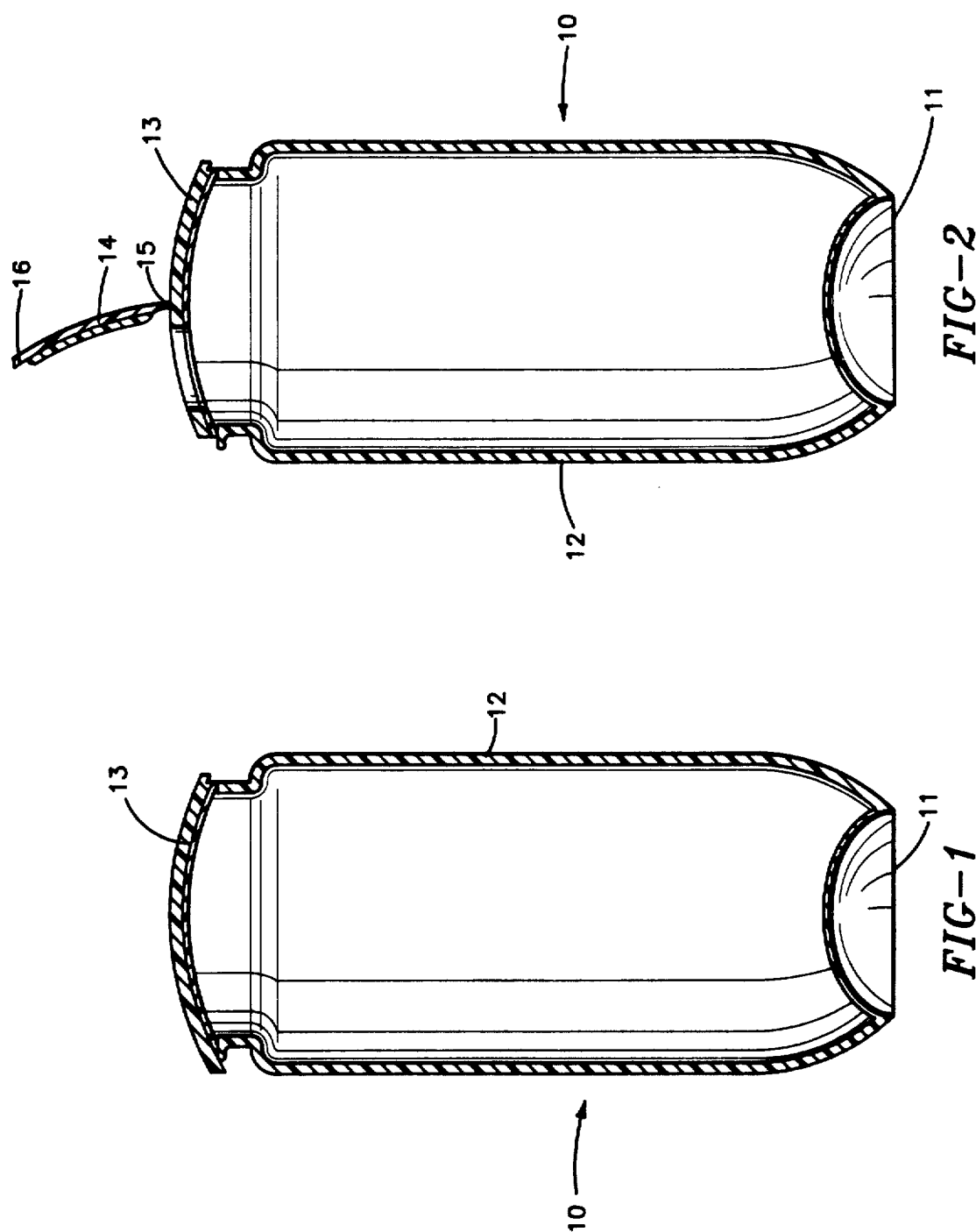

PLASTIC CONTAINER CLOSURE

This is a continuation of application Ser. No. 905,297 filed Jun. 29, 1992.

BACKGROUND OF THE INVENTION

The present invention deals with closures for plastic containers having wide top openings, such as jars and cans.

It is highly desirable to provide a plastic jar or can with a tamper-evident plastic closure capable of being easily opened and reclosed without the use of a tool, incorporating a gas permeation barrier, particularly when it is necessary to maintain the integrity of the contents of the container, as for example carbonated beverages. Thus, the closure should at least in part be a gas barrier. While showing whether it has been damaged or tampered with, it should also be sufficiently reclosable to avoid contamination of the contents after opening of the container.

To accomplish this is so difficult that plastic can closures were avoided for carbonated beverages, and aluminum lids are employed instead, the same as for the metal cans the plastic containers were intended to replace. When used with plastic cans, these lids, being of a different material than the can bodies, result in substantially increased cost of recyclcing the used cans, which, along with the high cost of the metal is the reason for the plastic can heretofore having been unable to replace the metal can in its prevalent markets.

Thus, the present invention represents an important advance in the use of plastic barrier containers with a wide top opening, i.e., wide-mouth containers and cans.

It is a principal objective of the present invention to provide a plastic closure for plastic containers having a wide top opening, e.g. cans, that is readily recyclable, that has resistance to gas permeation, is tamper-evident and capable of being easily opened and closed.

It is a still further objective of the present invention to provide a plastic container lid as aforesaid which is easy to prepare, inexpensive and easy to use in practice.

Further objects and advantages of the present invention will appear hereinbelow.

SUMMARY OF THE INVENTION

In accordance with the present invention, the foregoing objects and advantages are readily obtained.

In accordance with the present invention, a plastic container closure for plastic containers is provided which comprises: a plastic lid having top and bottom surfaces and a peripheral rim suitable for attachment to a plastic container to seal said container; a plastic liner juxtaposed the bottom surface of the lid resistant to gas permeation and preferably attached to the entire bottom surface of the lid; and means for providing a closable opening in the lid and in the liner comprising a tab attached to at least one of the lid and the liner, score means on said lid adjacent said tab to permit propagation of an opening in said lid starting from said tab to form a flap portion of said lid defining an opening in said lid, hinge means on said lid terminating the score means at a location opposed to said tab to permit the flap portion to be lifted and rotated from a closed position to an open position and from an open to a closed position, wherein the liner is securely attached to the bottom portion of said lid at said flap, and means on said liner adjacent said score means permitting the liner to propagate a break while forming the opening in the lid corresponding to the flap portion so that the broken portion of the barrier layer rotates with the flap portion, thereby forming a tamper evident closable opening in the container closure.

While the tab in the lid may extend beyond the rim, the lid and liner generally have an annular shape. The lid is preferably PET (polyethylene terephthalate), although any suitable plastic material may be used, as polyethylene, polypropylene, etc. The liner is preferably a highly crystalline oriented PET, but any other suitable barrier may be used, as EVOH, etc., both being selected to be readily recyclable together with the container. Other liner barrier materials such as PVDC are not favored because they are not compatible for recycling with the preferred plastics suitable for such containers. The score means may be a continuous notch in the lid in the shape of the flap opening to permit a tear starting at the tab to propagate and form the flap opening. In a preferred embodiment, however, the score means defines a detachable portion of the lid, the edge of which forms an interference fit with a juxtaposed rim portion of the lid and thereby becomes the flap. The means permitting a break to propagate in the liner where the said flap to which the liner is attached, is lifted, is preferably a notch juxtaposed the score means in the lid. The liner may be provided with uniaxial orientation corresponding to the desired direction of tearing, i.e., breaking. This will facilitate the said notch to tear while the flap to which it is secured is lifted, and thereby form the desired reclosable opening in the closure.

The closable opening generally comprises a small fraction of the surface of the closure, i.e., less than about 10% of its surface area.

It is a particular advantage of the present invention that the closure has gas barrier properties before the formation of the closable opening, and that the closable opening is easy to form and enables one to close the flap albeit without retention of the barrier properties.

In order to better render the closure tamper evident, a marker may be printed on or attached to the top surface of the lid, whereby any unwanted original lifting of the flap becomes accentuated, even if the flap is reclosed.

Further features of the present invention will appear hereinbelow.

BRIEF DESCRIPTION OF THE DRAWINGS

The present invention will be more readily understandable from a consideration of the following illustrative and partly schematic drawings, wherein;

FIG. 1 is a sectional side view of a container and attached closure of the present invention;

FIG. 2 is a side view similar to FIG. 1 showing the flap portion in the open position;

DETAILED DESCRIPTION OF PREFERRED EMBODIMENT

Figure 3:
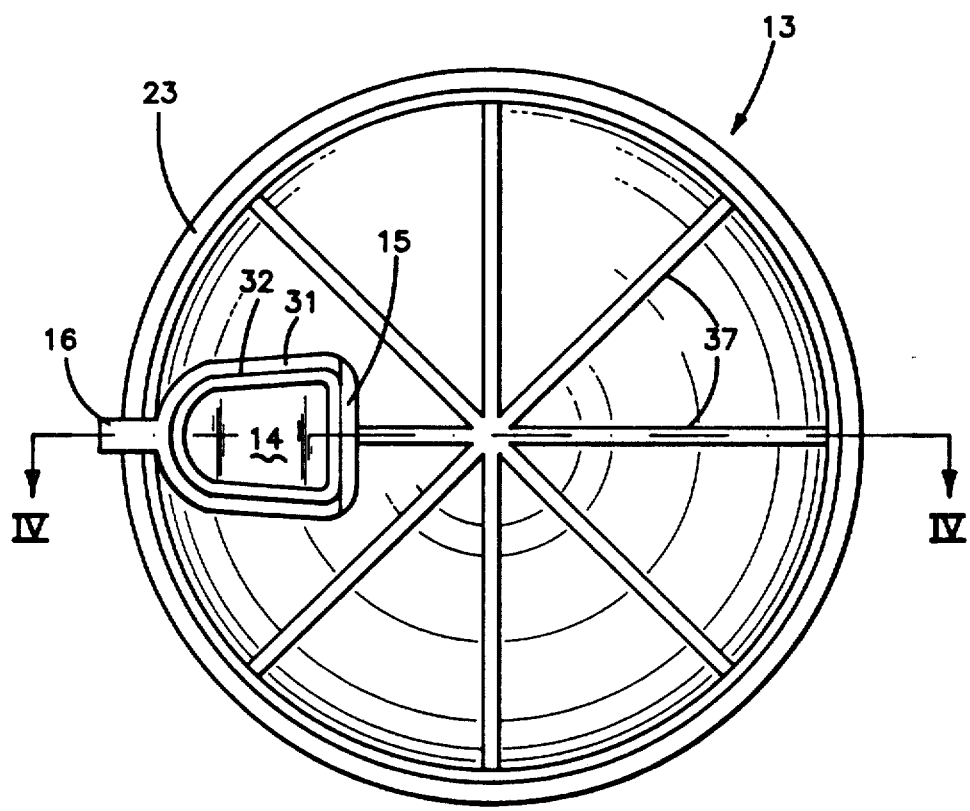
FIG. 3 is an enlarged top view of the container closure of the present invention.

FIGS. 1 and 2 show a sectional side view of a container 10 having a container bottom 11 and container side walls 12 extending upwardly from the container bottom and terminating in a closure 13 affixed to the side walls 12 as by welding or by any other desired means. The container shown in FIGS. 1 and 2 is particularly suitable for carbonated beverages by virtue of the domed bottom 11; however, it should be understood that the present invention should not be limited by the illustrative container format shown in FIGS. 1 and 2.

As shown in FIG. 2, closure 13 has a closable flap 14 rotatable via tab 16 about hinge 15 from an open position to a closed position and from a closed position to an open position. Flap portion 14 is shown in FIG. 2 in the open position at an angle of approximately 90° to closure 13, although it is to be understood that the flap portion may be rotated near 180° if desired to engage the portion of the closure 13 opposed to the opening formed therein by the flap portion. The closure and flap portion will be shown in more detail in FIGS. 3 and 4 described below.

FIGS. 3 and 4 show generally annular closure 13 incorporating a lid 20 having a top surface 21 and a bottom surface 22. The lid 20 has a peripheral rim 23 shown in FIG. 3 suitable for engagement with plastic container 10 as by weld 24.

Liner 30 is beneath the lid and as shown is bonded to and covers the entire bottom surface 22 of lid 20, although it may be bonded to and cover only a part thereof. The liner as indicated hereinabove is resistant to gas permeation. In the drawings, the thickness of the liner has been exagerated for clarity.

Figure 4A:
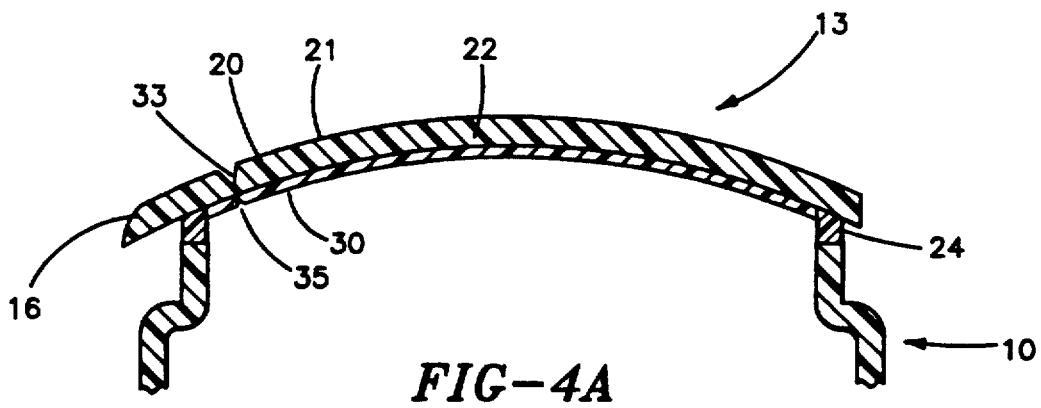
FIGS. 4A and 4B are modified enlarged sectional views through line IV—IV of FIG. 3; showing two embodiments of the present invention
Figure 4B:
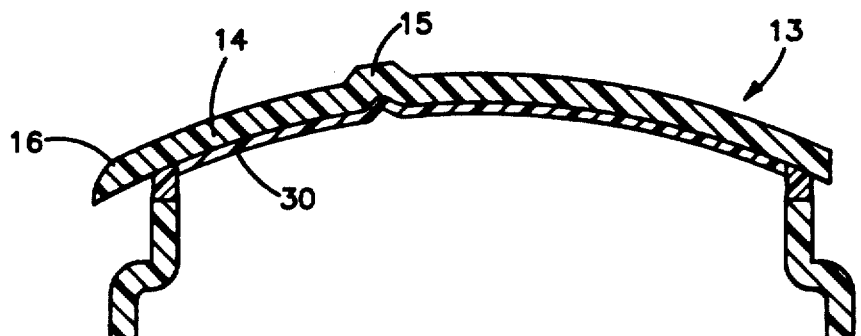
Figure 5:
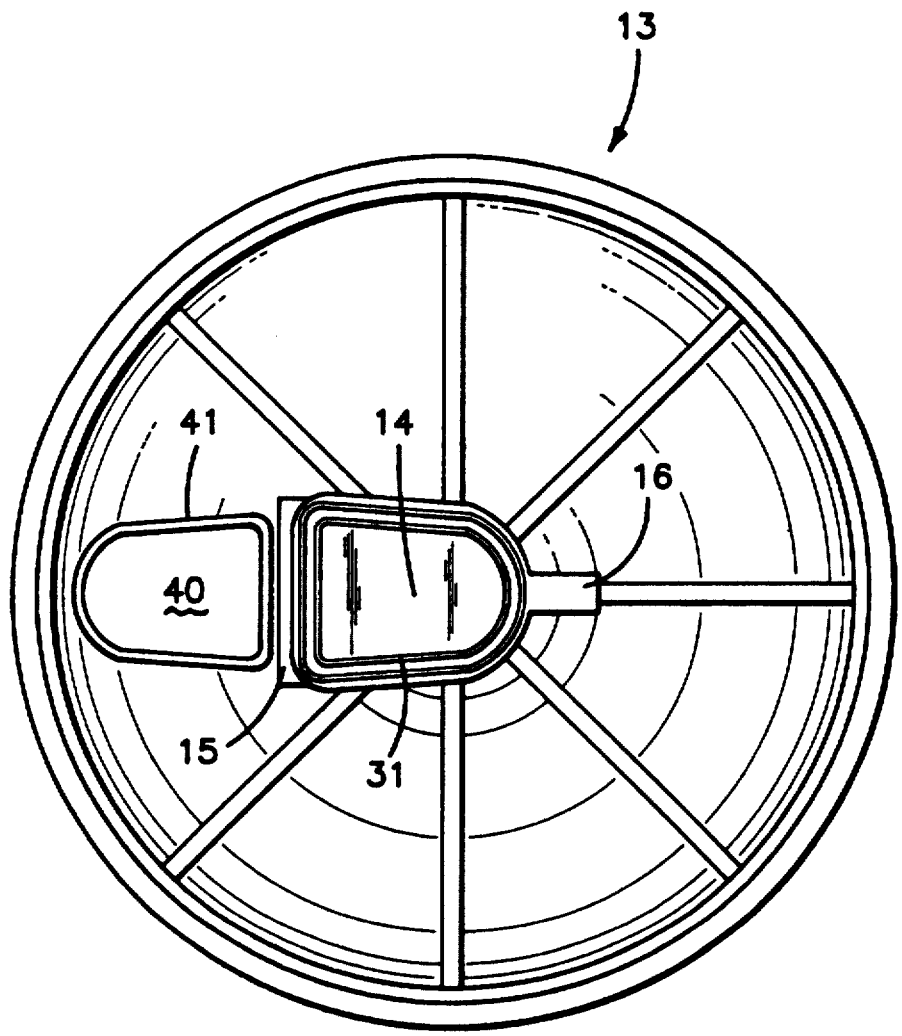
FIG. 5 is a top view similar to FIG. 3 with the flap portion open.

The closure is provided with a tab 16 preferably a part of lid 20. Score means 32 are provided on lid 20 adjacent tab 16, which score means may be a continuous notch 33 as shown in FIG. 4A or a groove 31 to provide a detachable flap 14 of the lid 20 31 as shown in FIG. 5 forming an interference fit with the opening rim 41 of the lid, as shown in FIGS. 3, 4B and 5. Thus, when the tab 16 is pulled, an opening in the lid is formed along the score means. The score means permits propagation of the opening in the lid starting from the tab and progressing along the groove 31 and rim 41, as shown in FIGS. 2, 3, 4B and 5.

Hinge means 15 are provided on the lid adjacent the score means and opposed to tab 16. The hinge means is part of flap 14 and permits the flap to be rotated from a closed position as shown in FIG. 3 to an open position as shown in FIG. 2 and the reverse.

In order to provide an opening in the lid through both the lid and the liner, notches 35 are provided in the liner as shown in FIG. 4A, permitting the liner to break along with said notches as the opening in lid 20 forms due to the flap being lifted as shown in FIG. 2 so that the broken portion of the liner rotates together with the flap, which forms a closable opening 40 in the container closure, as shown in FIG. 5. To assume that the portion of the liner under flap 14 will be forced to break by action of the flap, it is preferred to attach at least said portion to the bottom surface 22, as by adhesive or other means. The effectiveness of notch 35 may be enhanced by providing in the barrier layer orientation corresponding to the desired direction of tearing. Such orientation is at times by itself sufficient to permit the liner to tear. This will permit the barrier layer to tear along with flap 14 even without notch 35.

Lid 20 may if desired include reinforcing ribs 37 to resist deformation due to pressure within the container. The ribs serve to reinforce the closure and preclude excessive bulging under pressure whenever the lid is flat, extending slightly upward, or domed outward of the container. Both designs are favored to avoid trapping contaminants on the top of the container, as is often the case with the aluminum closures currently used.

Thus, in accordance with the present invention, the closure includes a lid with a flange matching that at the top of the container body it is to close, and is welded, or otherwise hermetically attached to it. If the closed container is to hold appreciable internal pressure, the lid may be stiffened by means of reinforcing ribs. The lid is preferably injection molded, but may also be thermoformed; the ribs, if used, may be solid or hollow.

The lid carries a flap which is hinged and thus may be bent upward, for example by grasping a finger pull or tab attached to it, that may be grasped beyond the outer rim. The flap may be attached to the rest of the lid around its entire periphery, or severed from it, except at the hinge. If it is attached, the entire periphery other than the hinge region is scored, e.g., provided with a notch; if not, an interference lock is provided between the flap and the rest of the lid, or as small a gap is left therebetween as can be made by the manufacturing process that is chosen. For example, if injection molded with a score, the wall-thickness under the score line of the notch may be 0.002"; if a gap is left it could be as small as 0.003" for injection molding. An interference lock as above may be designed as in the plastic bags trademarked ZIPLOC by Dow Chemical Company. The purpose of such an interference lock is to keep the flap from popping up if greater pressure is applied against it from below than the liner is capable of resisting without undue deformation. While it can resist that pressure, the lock will be readily pealed open when grasped at the finger pull and bent upward. If the pressure in the container is relatively low, as in beverages with low carbonation levels, the interference lock may not be necessary and a simple score may suffice.

On the inside of the lid, i.e., on the container side, a liner insert may be attached over the entire bottom surface, and at least to that of the flap. This liner is made of a plastic having better permeation resistance than the lid. It need not be the same material as the lid, but preferably compatible with it for purposes of recycling. Thus, if the container is made of the types of PET normally used for beverage bottles, which has relatively low gas permeation resistance, the liner may be made of PET which is higher than 40% crystallinity, or EVOH, both of which are compatible with the first mentioned PET.

The insert liner is typically thinner than the lid; the preferred method for producing it is thermoforming. It may be inserted into the injection mold and the lid molded behind it. Alternatively, the film from which it is made may be fed over the molded lid and warm- or cold-pressed into it, depending on the amount of deformation that is required to conform it to the inside of the lid. Also, if desired, adhesion between liner and lid may be enhanced by an adhesive layer applied onto the film stock or by the formed liner, or by means of an adhesive applied, as from a spray, at predetermined portions before contacting the two parts to be joined. Often it will be enough to join them merely by mechanical pressure.

The liner is provided with a score line at the periphery of the flap, or with a tear-initiating notch at the outermost region of that periphery. Thus, assuming a liner thickness of 0.005", the notched depth would be about half, i.e. 0.0025", preferably placed at the underside of the liner. To determine the notch depth, one calculates the force exerted by the pressure from the underside and compares the shear stress in the notch, to see whether the notch will withstand that stress, given the shear strength of the liner material chosen. So long as the flap is held down, i.e. closed, it will keep the film liner from bulging under pressure, particularly if it carries an interference lock, as above. To open, the flap is peeled upward by the tab or finger-pull. Since the liner is attached to it, the liner will tear along the notch and move with the flap.

In this manner, an outward openable closure is provided, without the disadvantage of the current metal closures, in which the flap bends downward, into the can, perhaps taking accumulated dirt with it. Before opening, the closure is tight against pressure and no more previous to fluids than the can body. Once opened, it may be reclosed by pushing the flap downward, but of course not resealed, since the liner will have been torn.

Tearing of the liner as above may be facilitated if the film stock from which it is made is oriented perpendicularly to the direction of the intended tear, and the liner formed from it aligned so that the intended tear will form in the direction of the orientation. In many instances, when so aligned, it is not necessary to notch the liner, but one may provide it with a small tear-initiating discontinuity, e.g., a perforation at the end of the intended tear.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A plastic closure for plastic containers, which comprises: a lid having top and bottom surfaces and a peripheral rim suitable for attachment to a plastic container to seal said container; a liner on the bottom surface of the lid resistant to gas permeation; and means for providing a closable opening in the lid and liner comprising a tab attached to at least the lid, a continuous notch on said lid adjacent said tab to permit propagation of an opening in said lid starting from said tab to form a flap portion of said lid defining an opening in the lid, hinge means on said lid terminating the notch and opposed to said tab to permit the flap portion to be rotated from a closed position to an open position and from an open position to a closed position; and a continuous notch on said liner adjacent and corresponding to said notch on the lid for permitting the liner to propagate a break forming a broken portion of the liner which corresponds in shape of the flap portion of the lid, said broken portion and said flap portion rotating together when the flap portion is moved to an open position, thereby forming a closable opening in the container closure.

2. A plastic container closure according to claim 1 wherein said liner is bonded to and covers the entire bottom surface of the lid.

3. A plastic container closure according to claim 1 wherein the lid and liner have a generally annular shape.

4. A plastic container closure according to claim 1 wherein said lid includes reinforcing ribs.

5. A plastic container closure according to claim 1 wherein the lid is polyethylene terephthalate.

6. A plastic container closure according to claim 5 wherein the liner is crystalline polyethylene terephthalate.

7. A plastic container closure according to claim 5 wherein the liner is oriented polyethylene terephthalate.

8. A plastic container closure according to claim 5 wherein the liner is crystalline and oriented polyethylene terephthalate.

9. A plastic container closure according of claim 5 wherein the liner is EVOH.

10. A plastic container closure according to claim 1 wherein the lid and liner are compatible for purposes of recycling.

* * * * *